(12) United States Patent
Burton et al.

(10) Patent No.: US 12,175,254 B2
(45) Date of Patent: *Dec. 24, 2024

(54) MOBILE SERVICE APPLICATIONS

(71) Applicant: Bytedance Inc., Wilmington, DE (US)

(72) Inventors: Michael Burton, San Francisco, CA (US); Shaheen Ghiassy, Portland, OR (US); Andrei Pitea, Dublin (IE); Adam Geitgey, Mountain View, CA (US); Jan Krems, Mountain View, CA (US); Daniel Beard, San Jose, CA (US); Matthijs Mullender, Sammamish, WA (US); Luis Felipe Brahm-Smart, San Francisco, CA (US)

(73) Assignee: Bytedance Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,547

(22) Filed: Jan. 5, 2023

(65) Prior Publication Data

US 2023/0176874 A1 Jun. 8, 2023

Related U.S. Application Data

(63) Continuation of application No. 17/247,938, filed on Dec. 31, 2020, now Pat. No. 11,579,891, which is a
(Continued)

(51) Int. Cl.
*G06F 9/4401* (2018.01)
*G06F 8/61* (2018.01)
(Continued)

(52) U.S. Cl.
CPC .............. *G06F 9/4401* (2013.01); *G06F 8/61* (2013.01); *G06F 9/445* (2013.01); *G06F 9/485* (2013.01)

(58) Field of Classification Search
CPC .......... G06F 9/4401; G06F 8/61; G06F 9/445; G06F 9/485
See application file for complete search history.

(56) References Cited

U.S. PATENT DOCUMENTS 6,366,876 B1    4/2002  Looney
6,782,408 B1 *  8/2004  Chandra ............... G06F 9/5061
                                                       709/224
(Continued)

OTHER PUBLICATIONS

Christopher Negus, "Starting and Stopping Services", Linux Bible, Apr. 27, 2015, pp. 377-422 XP055676962, ISBN: 978-1-118-99987-5, Mar. 17, 2020.

(Continued)

*Primary Examiner* — Aurel Prifti
(74) *Attorney, Agent, or Firm* — Alston & Bird LLP

(57) ABSTRACT

Techniques for improved mobile application architectures and service communication protocols are discussed herein. Some embodiments may include a mobile device configured for providing a mobile application including multiple service applications. The service applications may execute asynchronously and in separate containers, providing service orientated architecture (SOA)-like services with respect to other portions of the mobile application, or even external applications. The separation of a monolithic mobile application into separate service applications provide advantages in terms of application performance, development, and maintenance. For example, a subset of all service applications may be started up, and executed on demand to improve device resource utilization efficiency.

14 Claims, 9 Drawing Sheets

Related U.S. Application Data continuation of application No. 15/711,264, filed on Sep. 21, 2017, now Pat. No. 10,922,089.

(60) Provisional application No. 62/398,106, filed on Sep. 22, 2016.

(51) Int. Cl.
*G06F 9/445* (2018.01)
*G06F 9/48* (2006.01)

(56) References Cited

U.S. PATENT DOCUMENTS

| | | | |
|---|---|---|---|
| 7,174,540 B2 | 2/2007 | Ondrusek et al. | |
| 7,254,814 B1 | 8/2007 | Cormier et al. | |
| 7,702,891 B1 | 4/2010 | Nazarov et al. | |
| 8,910,172 B2 | 12/2014 | Vaidya et al. | |
| 9,164,807 B2* | 10/2015 | Blanc | G06F 9/5066 |
| 9,448,782 B1 | 9/2016 | Gershnik et al. | |
| 9,485,159 B1* | 11/2016 | Sant'Anna | H04L 41/0636 |
| 10,083,052 B1 | 9/2018 | Venkatraman et al. | |
| 10,296,309 B1 | 5/2019 | Mercille et al. | |
| 2003/0056193 A1 | 3/2003 | Perycz et al. | |
| 2004/0025163 A1* | 2/2004 | Babutzka | G06F 9/5038 |
| | | | 718/106 |
| 2007/0056193 A1 | 3/2007 | Schmeichel | |
| 2007/0294668 A1* | 12/2007 | Mohindra | G06F 8/61 |
| | | | 717/120 |
| 2008/0244551 A1* | 10/2008 | Jung | G06F 9/445 |
| | | | 717/163 |
| 2008/0244576 A1* | 10/2008 | Kwon | G06F 9/5016 |
| | | | 718/1 |
| 2009/0106780 A1 | 4/2009 | Nord et al. | |
| 2009/0125711 A1 | 5/2009 | Schneider | |
| 2010/0094861 A1 | 4/2010 | Andrade et al. | |
| 2010/0146041 A1* | 6/2010 | Gentry | G06F 16/00 |
| | | | 709/203 |
| 2011/0173405 A1 | 7/2011 | Grabarnik et al. | |
| 2011/0196659 A1 | 8/2011 | Salle et al. | |
| 2011/0289507 A1 | 11/2011 | Khan et al. | |
| 2012/0041844 A1 | 2/2012 | Shen et al. | |
| 2012/0317050 A1* | 12/2012 | Bermuth | G06Q 10/06 |
| | | | 705/348 |
| 2013/0047150 A1 | 2/2013 | Malasky et al. | |
| 2013/0097595 A1 | 4/2013 | Stern et al. | |
| 2014/0058873 A1 | 2/2014 | Sorensen et al. | |
| 2014/0108759 A1 | 4/2014 | Iwamitsu et al. | |
| 2014/0109129 A1 | 4/2014 | Fujii et al. | |
| 2014/0282189 A1 | 9/2014 | Bansal et al. | |
| 2014/0373027 A1* | 12/2014 | Pulapaka | G06F 9/485 |
| | | | 718/106 |
| 2015/0058267 A1 | 2/2015 | Kim | |
| 2015/0100791 A1 | 4/2015 | Chen et al. | |
| 2015/0100879 A1 | 4/2015 | Nandagopal et al. | |
| 2015/0120349 A1 | 4/2015 | Weiss | |
| 2015/0143092 A1 | 5/2015 | Senda | |
| 2015/0244767 A1 | 8/2015 | Jackowski et al. | |
| 2015/0363224 A1 | 12/2015 | Argenti et al. | |
| 2016/0007137 A1 | 1/2016 | Ahn et al. | |
| 2016/0055017 A1 | 2/2016 | Beveridge et al. | |
| 2016/0239340 A1 | 8/2016 | Chauvet et al. | |
| 2017/0024258 A1 | 1/2017 | Reid | |
| 2017/0315701 A1 | 11/2017 | Rolih | |
| 2017/0337088 A1 | 11/2017 | Wang et al. | |
| 2018/0349003 A1 | 12/2018 | Moreno et al. | |
| 2019/0108038 A1 | 4/2019 | Liu et al. | |
| 2019/0378163 A1 | 12/2019 | Sussman et al. | |

OTHER PUBLICATIONS

EP Appln No. 17852524.2 extended European search report dated Mar. 27, 2020, 12 pages.

International Search Report and Written Opinion for corresponding International Application No. PCT/IB2017/055785, dated Apr. 4, 2018, 9 pages.

\* cited by examiner

MOBILE SERVICE APPLICATIONS

CROSS REFERENCE TO RELATED APPLICATIONS

This application is a continuation of U.S. application Ser. No. 17/247,938, filed Dec. 31, 2020, which is a continuation of U.S. application Ser. No. 15/711,264, filed Sep. 21, 2017 (now U.S. Pat. No. 10,922,089), which claims the benefit of U.S. Provisional Application 62/398,106, filed Sep. 22, 2016, the entire contents of which are incorporated herein by reference.

FIELD

Embodiments of the invention relate, generally, to techniques for providing mobile applications to mobile devices.

BACKGROUND

Mobile applications provide content to users or consumers on their mobile devices, such as smartphones, tablets, wearables, etc. A mobile application may be downloaded onto a mobile device, installed (e.g., on a mobile operating system (OS)), and executed. During execution, the mobile application is associated with a thread and a global execution context (or "runtime environment"). However, mobile application development is restrictive (e.g., relative to web application development) in some important ways. For example, the monolithic thread and global execution context of a conventional mobile application makes application development increasingly difficult as the amount of code and complexity increases. Furthermore, mobile application binaries and updates are shipped (e.g., wirelessly) to mobile devices as monolithic entities (e.g., versions), creating inefficiencies in the development cycle and version management. Furthermore, developers are usually required to write separate code for different mobile operating systems (e.g., Apple Inc.'s iOS®, Google Inc.'s Android®), resulting in additional development inefficiencies. Furthermore, large mobile applications may use excessive amounts of mobile device resources (e.g., processing, memory, power, networking, etc.), which is not desirable for reasons such as reduced battery life, degraded computing performance, etc. In this regard and others as discussed herein, areas for improving current techniques have been identified.

BRIEF SUMMARY

Through applied effort, ingenuity, and innovation, solutions to improve such systems have been realized and are described herein.

Various embodiments of the present invention are directed to improved apparatuses, methods, and computer readable media for configuring a mobile device to provide a mobile application.

In a first example embodiment, a mobile device includes a mobile application having a plurality of service applications. The mobile device further includes circuitry configured to determine a dependency tree for the mobile application, wherein the dependency tree defines startup and shutdown dependencies among the plurality of service applications, and wherein each service application is configured to execute within a separate thread upon startup. The circuitry of the mobile device is further configured to determine to execute a first service application of the plurality of service applications, and determine, based on the dependency tree, one or more parent service applications of the first service application. The circuitry of the mobile device is further configured to startup the one or more parent service applications based on the dependency tree in one or more threads and, subsequent to starting up the one or more parent service applications, startup the first service application in a first thread separate from the one or more threads. The circuitry of the mobile device is further configured to subsequent to starting up the service application, execute the first service application within the first thread.

In some embodiments, the circuitry of the mobile device is configured to determine, based on the dependency tree, one or more parent service applications of the first service application by being configured to determine a plurality of parent service applications; and to startup the one or more parent service applications by being configured to startup the plurality of parent applications simultaneously or concurrently.

In some embodiments, the circuitry is configured to determine, based on the dependency tree, one or more parent service applications of the first application by being configured to determine a parent application and a grand-parent service application of the first service application, and wherein the circuitry is configured to startup the one or more parent service applications by being configured to startup the grand-parent service application, and startup the parent service application after the grand-parent service application has completed startup.

In some embodiments, the circuitry is configured to determine, based on the dependency tree, one or more parent applications of the first application by being configured to startup two parent applications of the first application simultaneously.

In some embodiments, the circuitry is configured to execute the first service application by being configured to: generate, within the first thread and by the first service application, an application page including a reference to a second service application, wherein the second service application has been started up as a parent service application of the first service application; provide the application page to a user interface of the mobile device; and in response to determining user selection of the reference, send a service application request to the second service application to execute the second service application. In such embodiments, the circuitry may be further configured to: listen, within the second thread by the second service application, for the service application request; receive the service application request; and in response to receiving the service application request, and within the second thread by the service application, execute the second service application. In this regard, executing the second service application may include generating a second application page and providing the second application page to the user interface of the mobile device. Additionally or alternatively, the first service application may be a base application coded in a native mobile operating system code format and the second service application may be coded in a standard mobile application code format. The circuitry may further configured to update the second service application without updating the first service application. Moreover, the second application page may include a promotion details page or a redemption information page.

In some embodiments, at least two of the plurality of service applications utilize different code formats.

In some embodiments, at least one of the plurality of service applications utilize a standard mobile application code format.

In some embodiments, the circuitry is further configured to shutdown the first service application and the one or more parent service applications in an order defined by the execution tree.

In some embodiments, the circuitry is configured to shut startup first service application and the one or more parent service applications in an order defined by the execution tree.

In some embodiments, the circuitry is further configured to shut down the first service application based on the execution tree.

In some embodiments, the first service application is a promotion details page service application configured to provide a promotion detail page to a user interface of the mobile device, and the circuitry is configured to determine to execute the first service application in response to selection of a reference within an electronic marketing communication or an external application.

In some embodiments, the circuitry is configured to determine to execute the first service application in response to receiving a service application request from a base application of the mobile application, and the base application is configured to execute within a separate thread from the plurality of service applications.

In some embodiments, determining the dependency tree includes referencing a configuration file including an application service array.

In some embodiments, the circuitry is configured to startup the one or more parent service applications based on the dependency tree by being configured to startup a subset of service applications.

In some embodiments, startup of the first service application includes placing the first service application in a listening state for service application requests from a second service application, a base application, or an external application.

In some embodiments, the circuitry is further configured to execute the first service application by being configured to: listen for service application requests from a second service application, a base application, or an external application; and in response to receiving a service application request, execute a requested function of the first service application. In some such embodiments, the service application request includes a promotion identifier and the circuitry is configured to execute the requested function by being configured to provide a promotion details page to a user interface of the mobile device.

In a second example embodiment, the mobile device may perform a method for which it is configured. In this example embodiment, the method includes determining, by the circuitry of the mobile device, application a dependency tree for the mobile application, wherein the dependency tree defines startup and shutdown dependencies among the plurality of service applications, and wherein each service application is configured to execute within a separate thread upon startup. The method further includes determining, by the circuitry, to execute a first service application of the plurality of service applications, and determining, by the circuitry and based on the dependency tree, one or more parent service applications of the first service application. The method further includes starting up, by the circuitry, the one or more parent service applications based on the dependency tree in one or more threads, and subsequent to starting up the one or more parent service applications, starting up, by the circuitry, the first service application in a first thread separate from the one or more threads. The method also includes, subsequent to starting up the service application, executing, by the circuitry, the first service application within the first thread. In various embodiments, the method further includes performance of the various functions for which the circuitry is configured, as described above and below.

In a third example embodiment, at least one non-transitory computer readable medium is provided for causing the mobile device to perform the operations noted above and described in greater detail below. The at least one non-transitory computer readable medium stores the plurality of service applications and further stores instructions that, when executed by the mobile device, cause circuitry of the mobile device to perform the functions recited above. Accordingly, some embodiments may include methods, while other embodiments may include circuitry and/or media configured to implement the methods and/or other functionality discussed herein.

These characteristics as well as additional features, functions, and details of various embodiments are described below. Similarly, corresponding and additional embodiments are also described below.

BRIEF DESCRIPTION OF THE DRAWINGS

Figure 1:
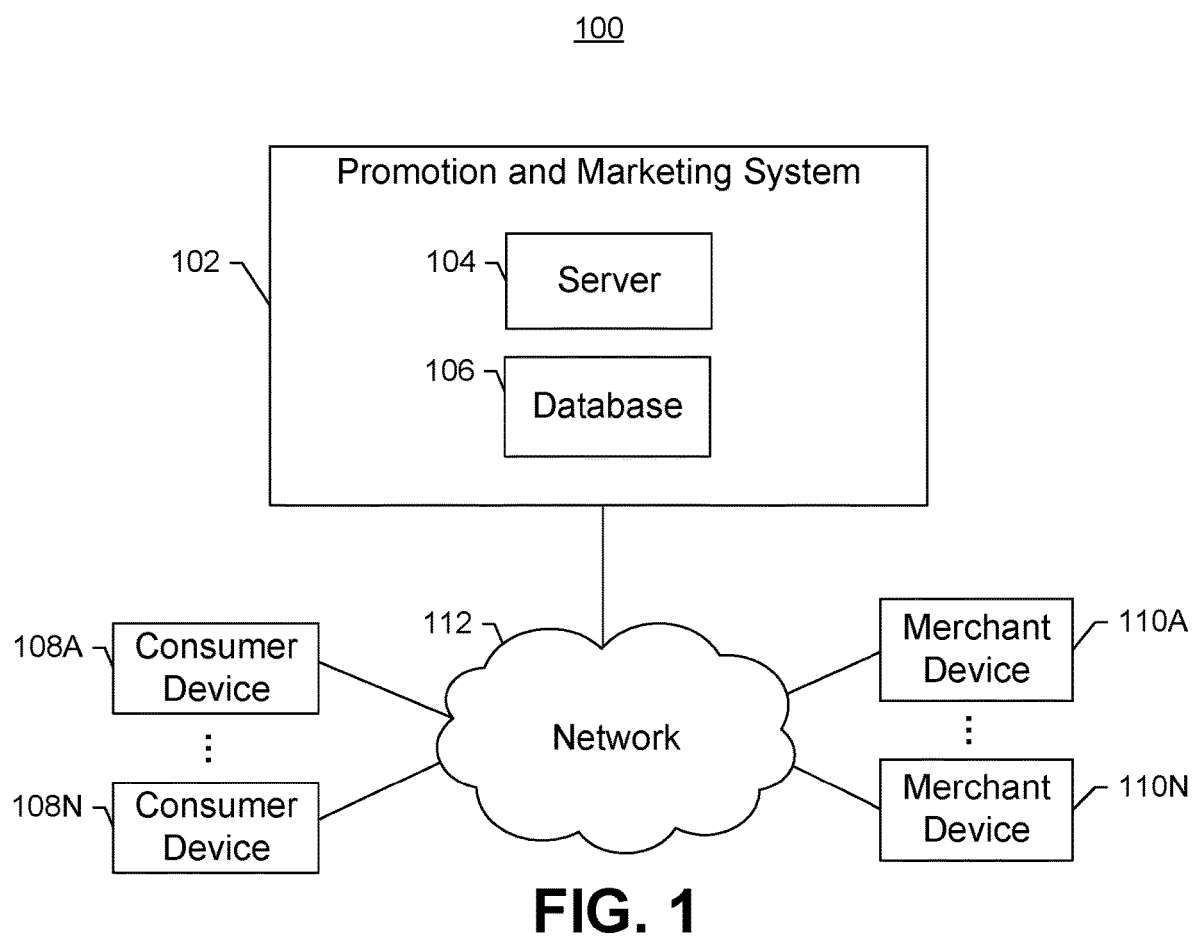
Figure 2:
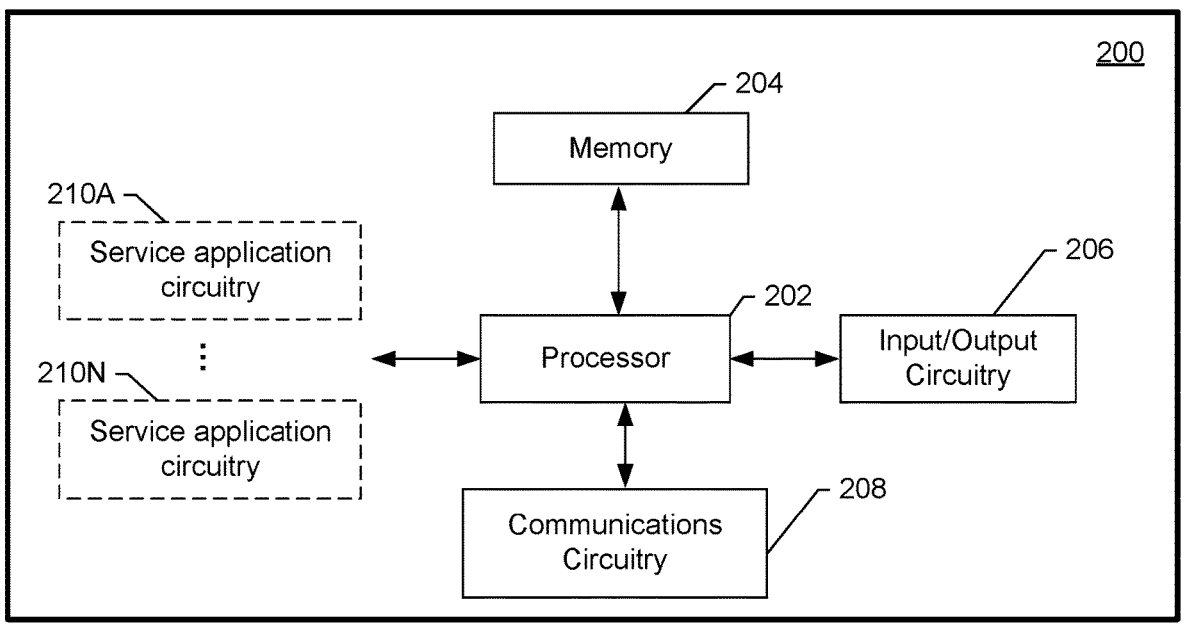
Figure 3:
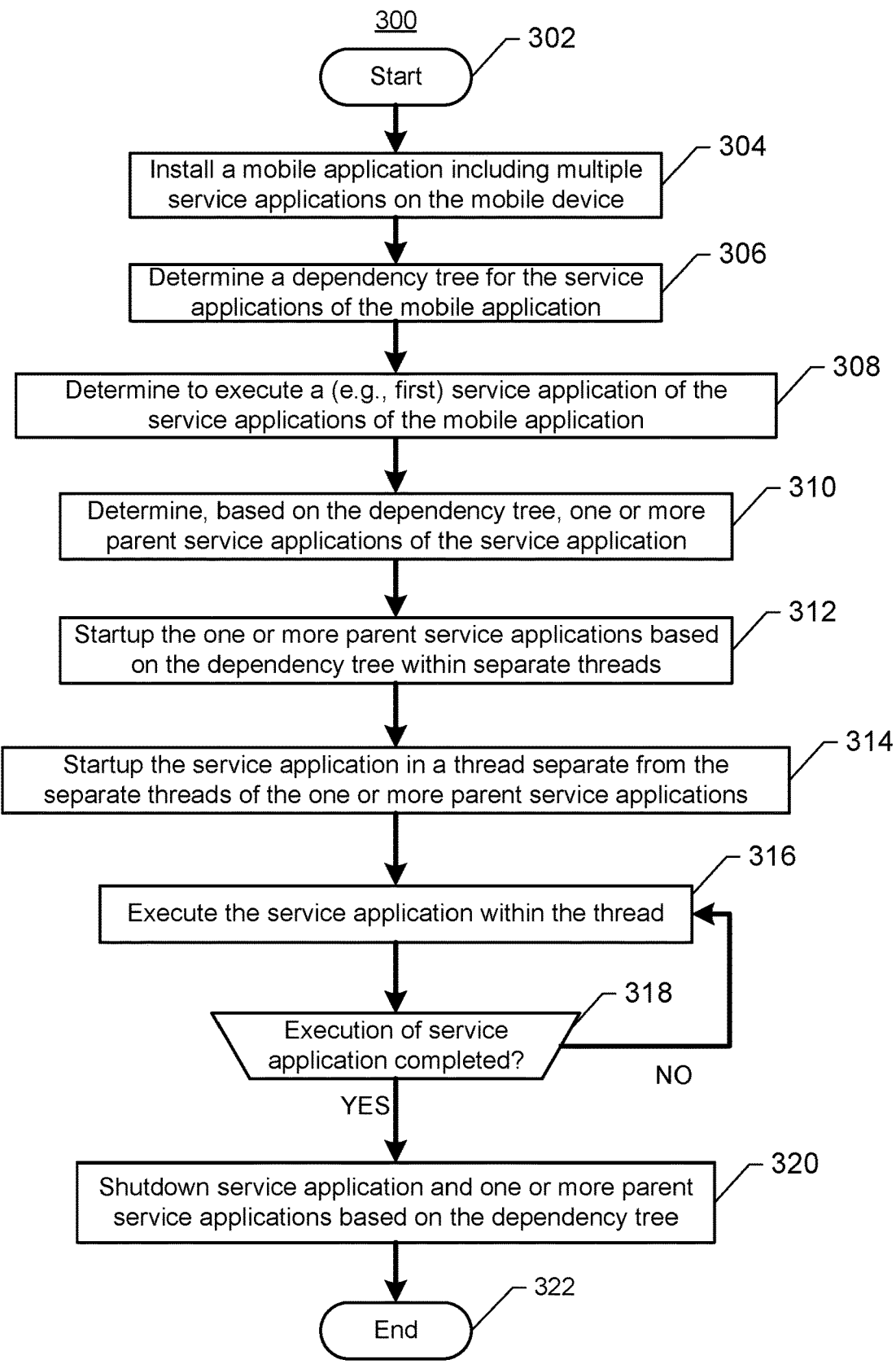
Figure 4:
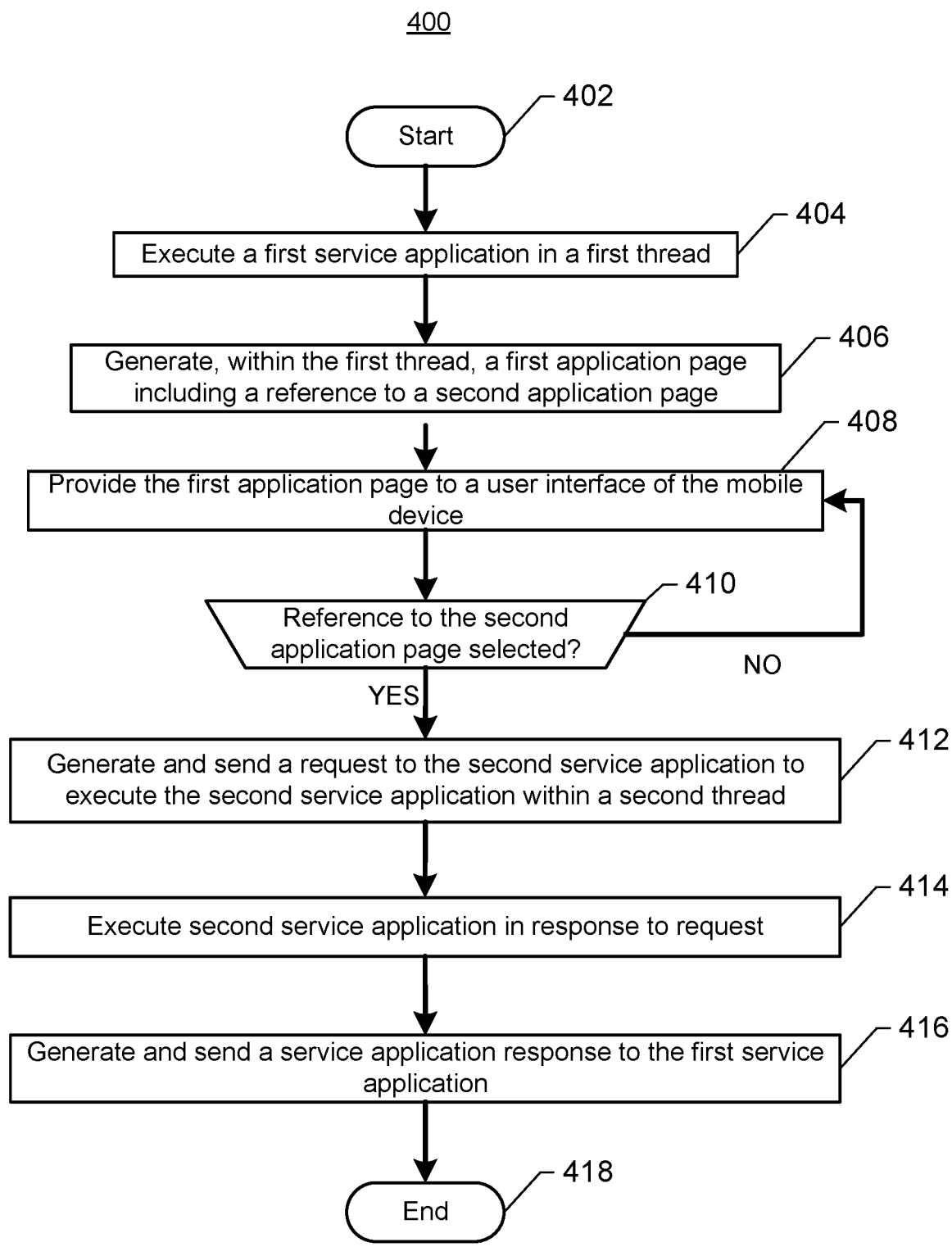
Figure 5:
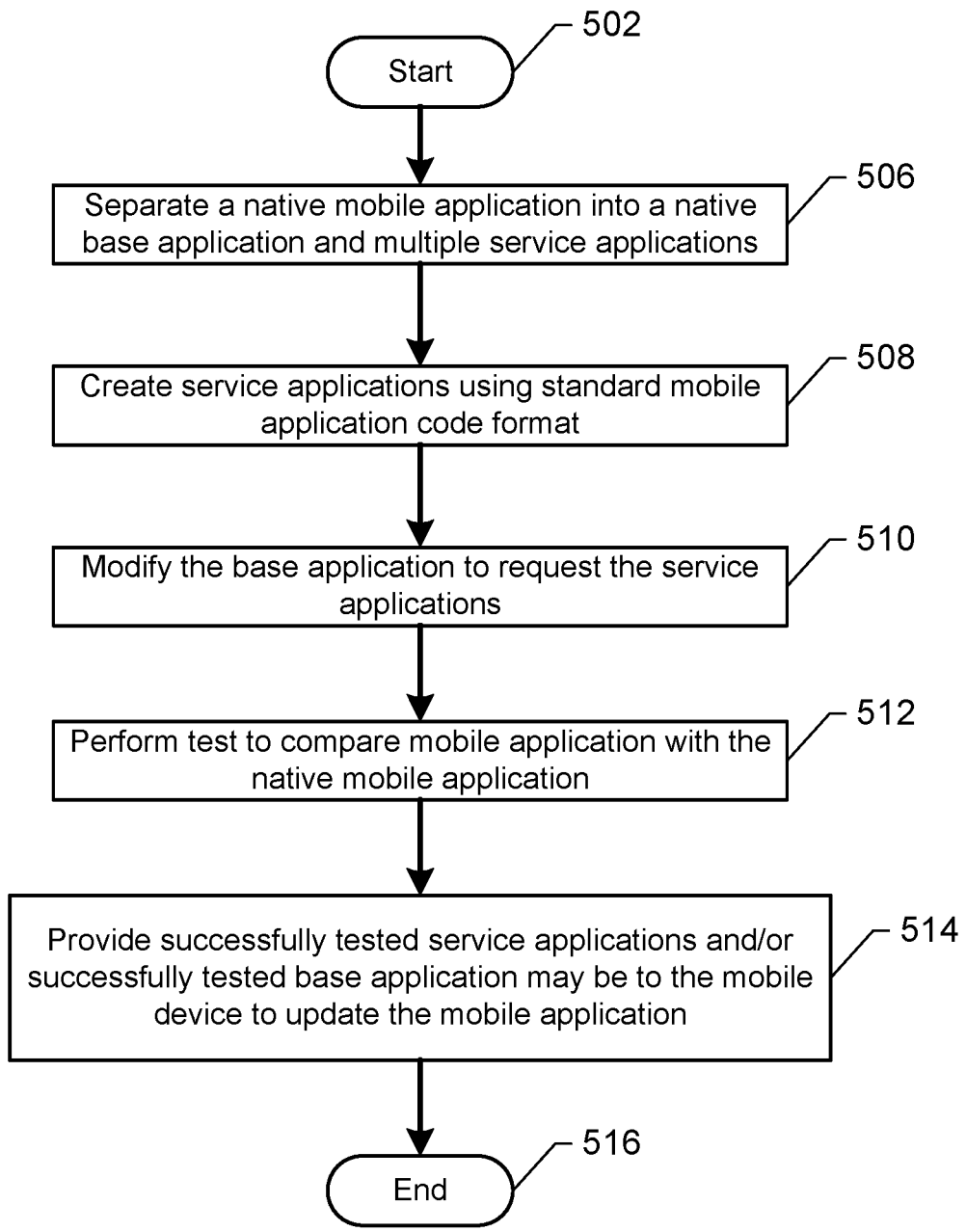
Figure 6:
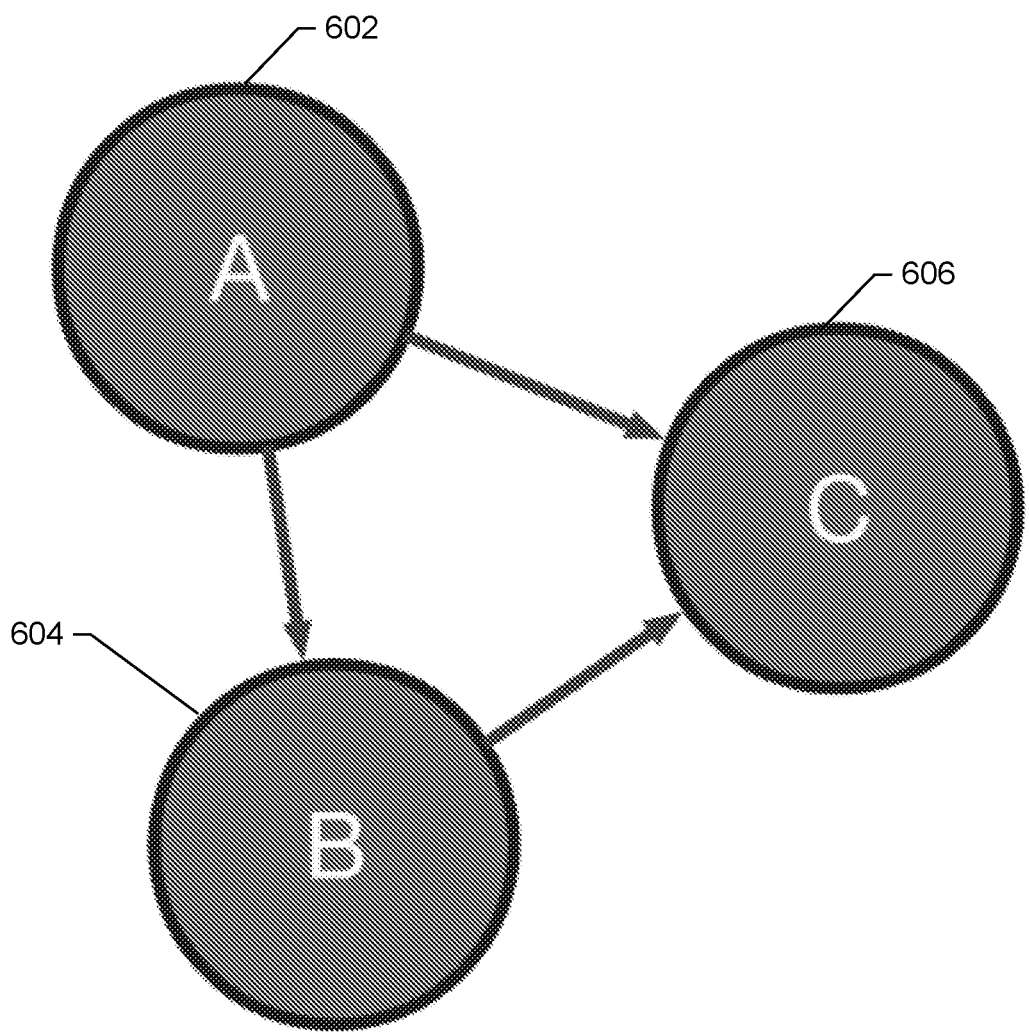
Figure 7:
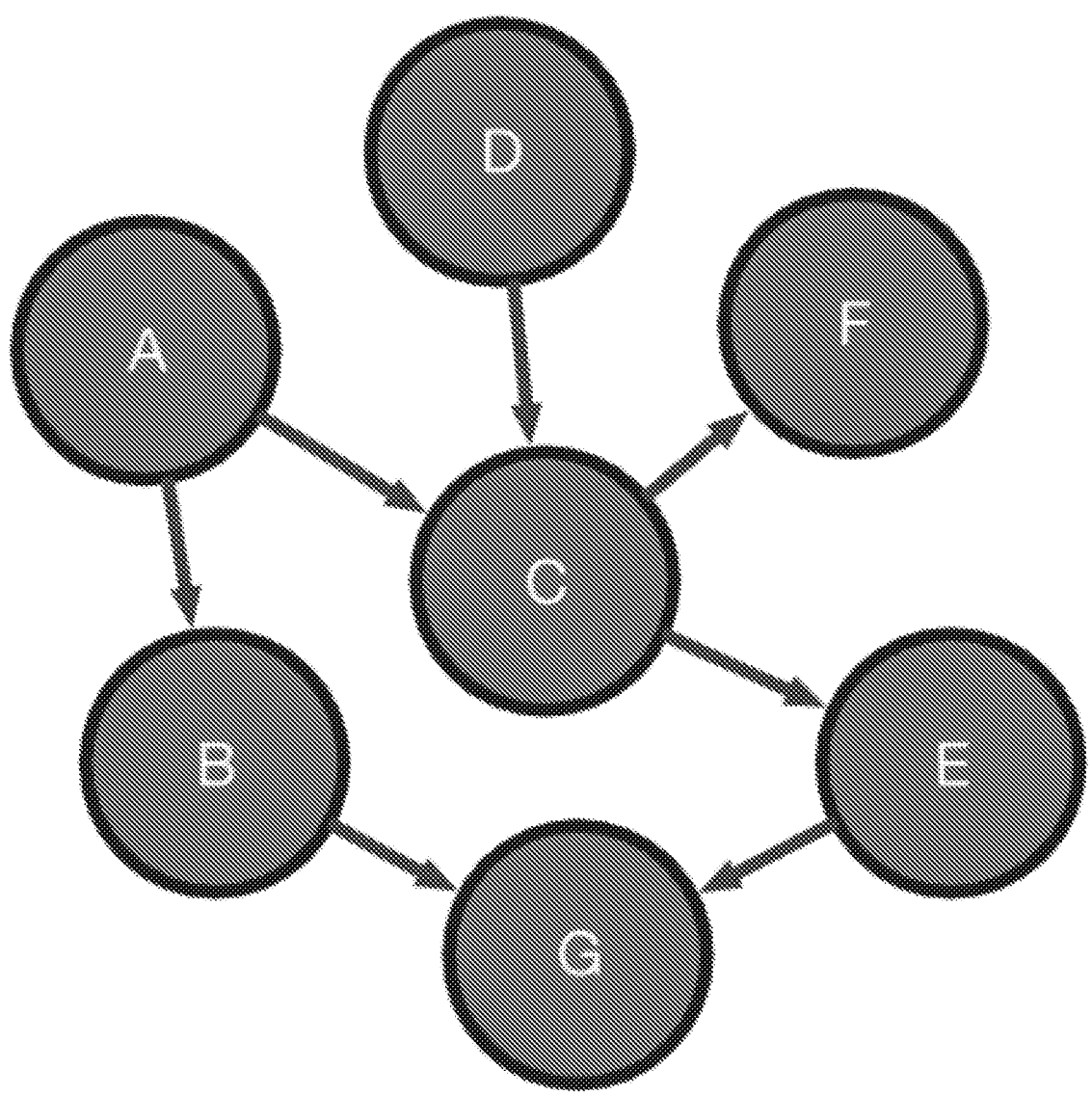
Figure 8:
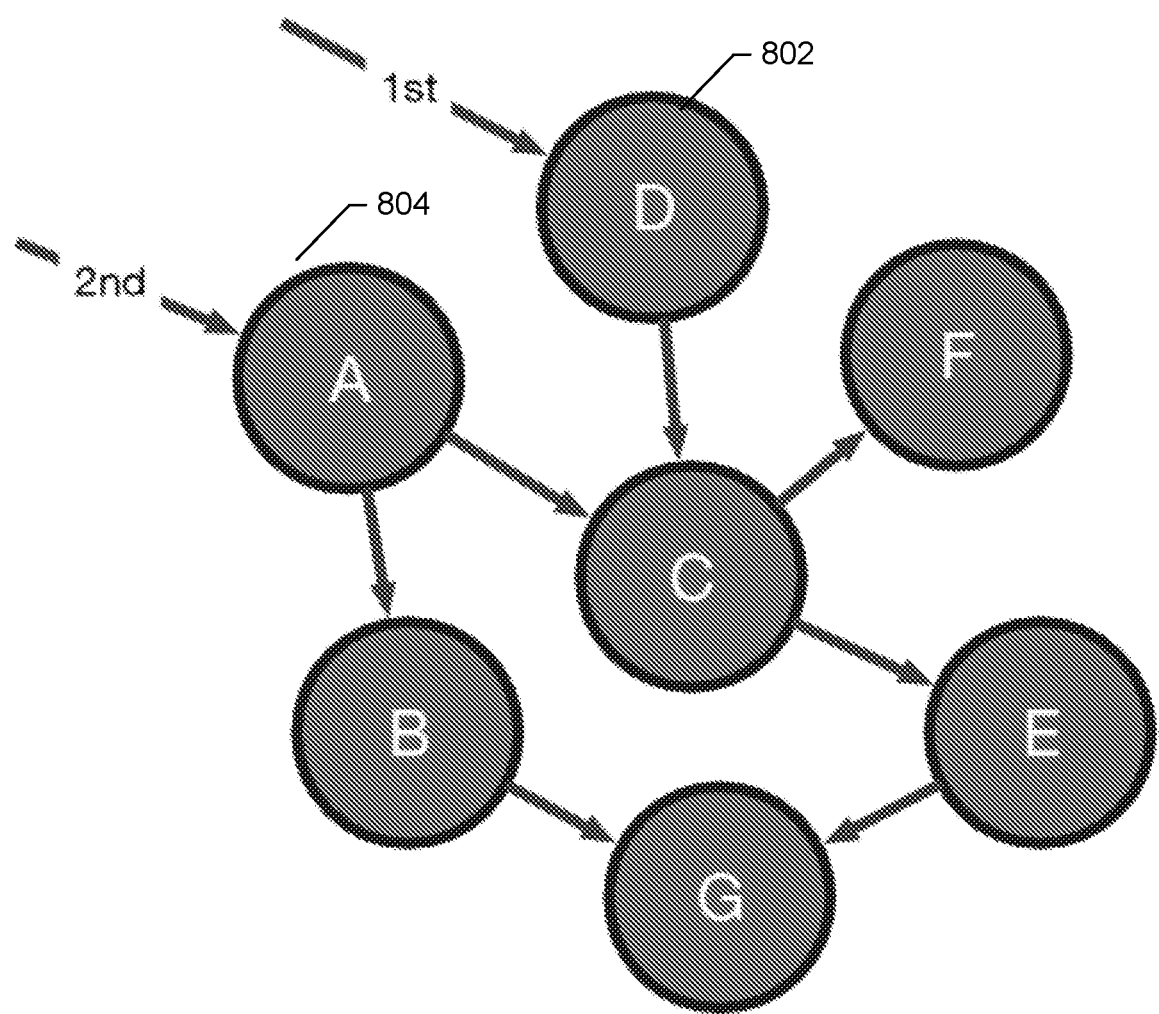
Figure 9:
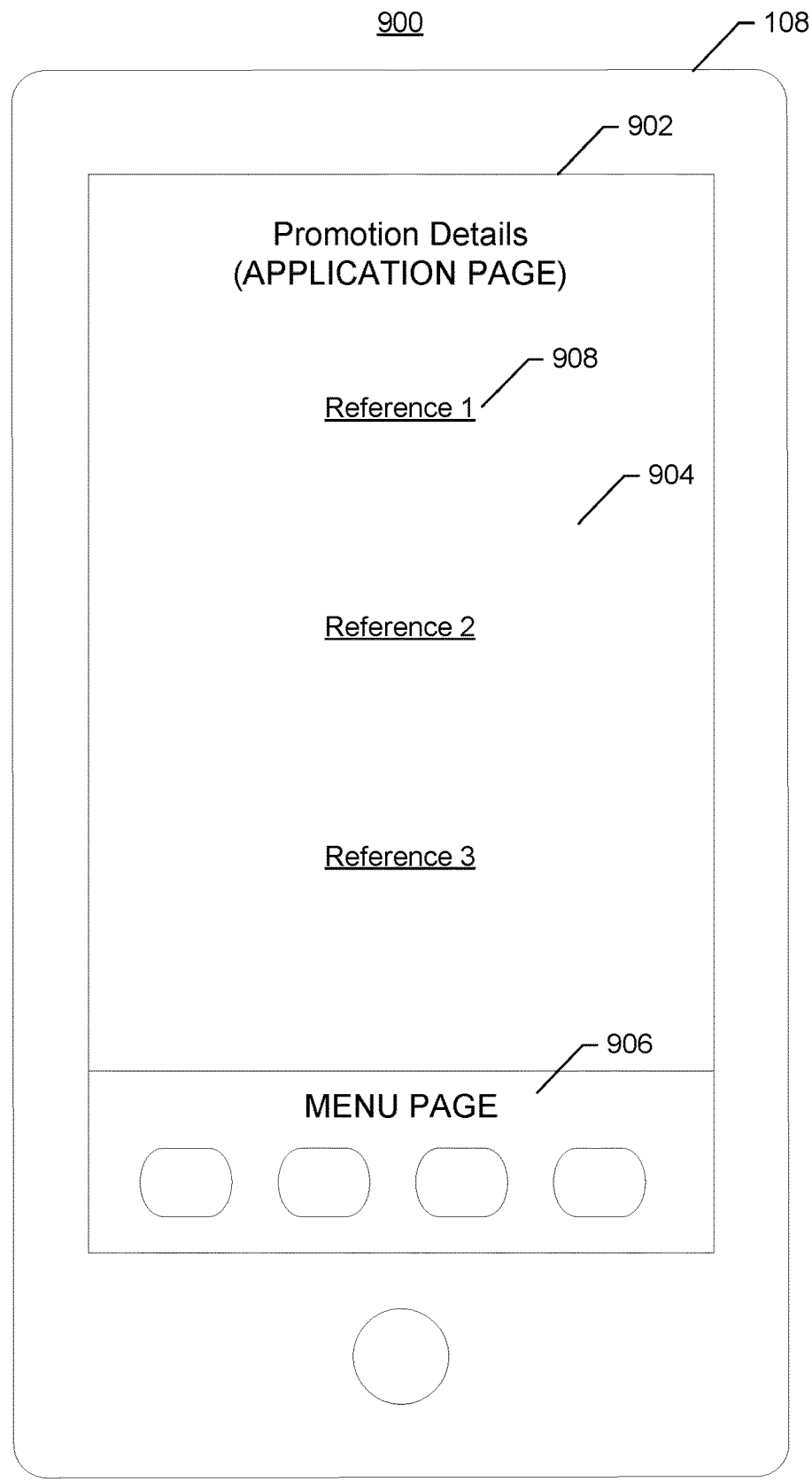

Having thus described some embodiments in general terms, reference will now be made to the accompanying drawings, which are not necessarily drawn to scale, and wherein:

FIG. 1 shows an example of a system in accordance with some embodiments;

FIG. 2 shows a schematic block diagram of example circuitry in accordance with some embodiments;

FIG. 3 shows a flow chart of an example of a method for executing a mobile application including multiple service applications in accordance with some embodiments;

FIG. 4 shows a flow chart of an example of a method for requesting a service application in accordance with some embodiments;

FIG. 5 shows a flow chart of an example of a method for service application development in accordance with some embodiments;

FIGS. 6-8 show examples of dependency trees in accordance with some embodiments; and FIG. 9 shows an example of a user interface including an application page in accordance with some embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" or "promotion service" may include a service that is accessible via one or more computing devices and that is operable to provide promotion and/or marketing services on behalf of one or more providers that are offering one or more instruments that are redeemable for goods, services, experiences and/or the like. The promotion and marketing service may be provided by a promotion and marketing system. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. The parameters of a promotion may be defined by promotion data. In some embodiments, the promotion data may define one or more redemption locations for a promotion, such as a merchant shop, restaurant, retail shop, etc.

Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), (e.g., consumer device) location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, and/or presence-based wireless detection (e.g., where the consumer device is detected upon entering a communicable range of a detecting device, such as a beacon or merchant device located at a merchant shop/redemption location) such as personal area networks (PAN) (e.g., using WiFi, Bluetooth, etc.), infrared or other visual sensors, and/or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account.

A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) text message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

System Architecture and Example Apparatus

Methods, apparatuses, and computer program products of the present invention may be embodied by any of a variety of devices. For example, the method, apparatus, and computer program product of an example embodiment may be embodied by a mobile device (or "consumer device" when the mobile device is associated with a consumer) configured to communicate with one or more servers. The mobile device may be embodied in various types of mobile terminals, such as a smartphone, wearable device (e.g., smart glasses, smart watch, virtual reality headset, etc.), tablet computer, laptop computer, or any combination of the aforementioned devices.

In this regard, FIG. 1 shows an example computing system within which embodiments of the present invention may operate. Consumers and merchants may access a promotion and marketing service from a promotion and marketing system 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing system 102 may comprise a server 104 and a database 106.

The server 104 may be embodied as a single computer or multiple computers. The server 104 may provide a mobile application (including multiple service applications) to the consumer device 108, as well as facilitate execution of the mobile application by providing online services. The mobile application may operate with the server 104 and provide electronic data to the server, and receive electronic data from the server. Similarly, the server 104 may receive data from or send data to various sources, including but not necessarily limited to the consumer devices 108A-108N and the merchant devices 110A-110N. For example, the server 104 may be operable to receive and process clickstream data provided by the consumer devices 108 (e.g., entered via the mobile application) and/or the merchant devices 110. The server 104 may facilitate the generation and providing of various electronic marketing communications based on the received electronic data (e.g., historical promotion data, electronic marketing data, etc.). The server 104 may also facilitate e-commerce transactions, such as based on transaction information provided by the consumer devices 108 via the mobile application and/or the merchant devices 110. Although a single server 104 is shown, system 102 may include one or more servers 104.

Database 106 may be embodied as a data storage device such as a Network Attached Storage (NAS) device or devices, or as a separate database server or servers. The database 106 includes information accessed and stored by the server 104 to facilitate the operations of the promotion and marketing system 102. For example, the database 106 may include, without limitation, historical promotion data, user account credentials for system administrators, merchants, and consumers, promotion data indicating the products and promotions offered by the promotion and marketing service, clickstream data, analytic results, reports, financial data, and/or the like.

The consumer devices 108A-108N may be any computing device as known in the art and operated by a consumer. Electronic data received by the server 104 from the consumer devices 108A-108N may be provided in various forms and via various methods. In embodiments where a consumer device 108 is a mobile device, such as a smart phone or tablet, the consumer device 108 may execute an "app," "mobile application," or "mobile consumer application" to interact with the promotion and marketing system 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing system 102 may leverage the application framework offered by the mobile operating system to allow consumers to designate which information is provided to the app and which may then be provided to the promotion and marketing system 102. In some embodiments, consumers may "opt in" to provide particular data to the promotion and marketing system 102 in exchange for a benefit, such as improved relevancy of marketing communications offered to the user. In some embodiments, the consumer may be provided with privacy information and other terms and conditions related to the information provided to the promotion and marketing system 102 during installation or use of the app. Once the consumer provides access to a particular feature of the mobile device, information derived from that feature may be provided to the promotion and marketing system 102 to improve the quality of the consumer's interactions with the promotion and marketing service.

For example, the consumer may indicate that they wish to provide location information to the app from location services circuitry included in their mobile device. Providing this information to the promotion and marketing system 102 may enable the promotion and marketing system 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing system 102. For example, the consumer may decide at a later point to disable the ability of the app to access the location services circuitry, thus limiting the access of the consumer's location information to the promotion and marketing system 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

The consumer device 108 may be configured to execute a mobile application including multiple service applications. Each service application may be configured to execute in a separate "container," including a unique thread and execution context. As such, the mobile application provides multi-threading performance on a mobile device. The mobile application may be defined with respect to a dependency tree. The dependency tree is a data structure that defines startup and shutdown dependencies among the service applications of the mobile application. When a particular service application is needed, the consumer device 108 may be configured to determine one or more parent service applications of the service application from the dependency tree, and startup each parent service application (e.g., that is not already started) in an order defined by the dependency tree. Similarly, when a particular service application is not needed and thus can be shutdown (e.g., to preserve computing resources), the service application as well as one or more parent service applications that are no longer be used (e.g., as a dependency) may also be shutdown in an order defined by the dependency tree. Within each service, the code may be single-threaded, which makes for easily understandable and maintainable code. For the mobile application as a whole, each service application runs using its own (e.g., JavaScript) core and its own thread to create a multi-threaded network of service applications executing on the mobile device 108.

In some embodiments, the mobile application may be a mobile consumer application configured to interface with the promotion and marketing system 102. Here, each service application may be associated with a particular functionality, such as the generation of a particular application page of the mobile consumer application. For example, a first service application may be configured to provide a home page, a second service application may be configured to provide a promotion detail page, a third service application may be configured to provide a redemption information page, and so forth. The various pages may include links or references to each other, which may be used a basis for the defined dependencies within the dependency tree. For example, the home page provided by a first service application executing in a first thread may include links to one or more promotions. In response to selection of a link of a promotion, a promotion detail page for the promotion may be generated by a second service application (e.g., a promotion detail page service application) executing in a second thread, and provided to a user interface of the consumer device 108. As such, execution of the first service application may require startup of the second service application dependency.

The service applications may be configured to utilize a service orientated architecture (SOA) or microservices architecture pattern. The service applications may be configured to facilitate messaging, startup, shutdown, and coordination among each other. The services applications may operate like servers that wait in a listening state, and interact and trigger executions through RESTful contracts. In accordance with the SOA design, the service applications may include the following properties: (1) explicit functional boundaries, (2) autonomous services that do not access the memory space, dependencies, etc., (3) service applications share schema and contract, not class, and (4) service compatibility is based on policy.

For example, a first service application may generate and send a request to execute a second service application, which initiates the execution of the second service application. Furthermore, any service application dependencies of the second service application that have not been started may be started prior to execution of the second service application. In the context of a consumer mobile application, a service application may be dedicated to generating a promotion detail page within the user interface. Here, when the promotion detail page is to be displayed within the user interface, a call can be made to a promotion detail page service to display the promotion detail page, and the required information (e.g., a promotion ID) may be passed to the service application as part of the call.

A particular service application may also be requested in ways other than another service action, such as by an external application or device. For example, the consumer device 108 may be configured to determine to execute a service application (e.g., a promotion detail page of a promotion) in response to user selection of a link, button, or reference (e.g., associated with the promotion) in an electronic marketing communication (e.g., email, text message, application message, mobile push alert, etc.) provided to the consumer device 108 from the system 102. Only the referenced service application and parent service application dependencies need to be started, while other service applications or portions of the mobile application may remain or be shutdown. Once started, a similar call can be made to the promotion detail page service application, including the promotion ID associated with the selected link, button or reference.

The container structure of the service applications provide numerous technical advantages in connection with application development. For example, individual service applications may be updated without updating the other service applications of the mobile application. When a bug or defect is discovered post release for a particular service application, that service application may be patched or rolled back without updating or otherwise modifying the other service applications. In some embodiments, the system 102 may be configured to control the individual updating of service applications automatically when an update is prepared, such as without requiring user input or specific permission. In some embodiments, the system 102 may be configured to perform partial rollouts of a service application update to a subset of the population of users/consumer devices 108.

The different service applications may be developed separately, such as by different developers or teams. In some embodiments, service applications may be coded with a standard mobile application code format that is supported across multiple mobile device operating systems. For example, the React Native framework may be used to allow developers to code in JavaScript but produce native user interfaces on both iOS and Android mobile operating systems. In another example, an HTML5-based framework or AngularJS may be used as the standard mobile application code format. Native user interfaces allow for responsive, fluid applications akin (e.g., from a user perspective) to applications coded in native mobile operating system code format or language. Advantageously, the mobile application may employ the standard mobile application code format within the service applications such that a significant portion (e.g., 80-90%, in one example) of the service applications share a codebase compatible with multiple mobile operating systems (e.g., iOS and Android). Thus duplications in mobile application development can be avoided. For example, rather than developing two applications having entirely different code base for iOS and Android, and thus resulting in slow release cycles with heavy verification efforts for each version release, a single code base and verification can be performed for one or more service application using a standard mobile application code format. In some embodiments, service applications configured to generate and provide an application page for the user interface of the mobile device 108 may rely on React Native as the standard mobile application code format supported across multiple mobile device operating systems.

In some embodiments, at least two service applications of a mobile application may be coded using different programming code formats or languages. Because service applications execute in separate containers and interact using service calls (e.g., RESTful contracts) of defined outputs and inputs, interoperability across programming languages is possible within a single mobile application, such as even when internal programming (e.g., functions, sub-functions, user interface components, etc.) of a service application is modified or updated. Advantageously, distributed developers or development teams may work efficiently while minimizing the introduction of incompatible code.

Separate service applications may also support continuous or near-continuous development of the mobile application. For example, one or more service applications may be updated individually without updating the entire mobile application. As such, it is possible to skip mobile application store reviews for bug fixes, fix bugs without user-initiated application updates, update portions of the mobile application on a mobile device 108 without requiring download and re-install of the entire mobile application, and finer control of update roll out on mobile device platforms (e.g., limited to a percentage of the user base or mobile device population).

In some embodiments, a mobile application native codebase (e.g., compatible with a single mobile OS) may be transformed from a monolithic architecture to a SOA. For example, a mobile application configured to provide multiple application pages may be converted on a page-by-page basis where functionality associated with each application page is implemented within a separate service application. Furthermore, each service application may be implemented using a standard mobile application code format, such as in JavaScript using React Native. As such, the service applications for each application page uses a standard mobile application code format. Native routing code may be added to the mobile application to handle routing between native code and the service application pages seamlessly. For example, a "display" status parameter may be tracked and updated by the native routing code to control which service application, and associated page, is presented to the user interface.

Subsequent to conversion from native to the standard mobile application code format, A/B testing may be performed on application pages as modified relative to the native pages. The A/B testing may be designed to evaluate areas such as user interaction (e.g., how frequently the user interacts with the re-implemented page compared to the native page, ideally no change), page performance (e.g., how fast the re-implemented page loads or reacts to user inputs compared to the native page), overall application performance (e.g., how fast the modified application boots up compared to the native application, memory usage-because high memory usage means the operating system will reject the application from memory more often, leading to more cold starts), developer experience (e.g., how easily development is using these technologies compared with existing technologies), code sharing (e.g., how much code can or should most use service applications to achieve best performance), etc.

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing system 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing system 102 to enable the promotion and marketing system 102 to generate promotions or other marketing information to be provided to consumers.

Example Apparatus(es) For Implementing Various Embodiments

The server 104, database 106, mobile device 108 or merchant device 110 may be embodied by one or more computing systems or devices, such as apparatus 200 shown in FIG. 2. As illustrated in FIG. 2, the apparatus 200 may include a processor 202, a memory 204, an input/output circuitry 206, communications circuitry 208, and service application circuitries 210A-N. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus 200. The memory 204 may be non-transitory and May include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

When the apparatus 200 is part of a mobile device 108, the apparatus 200 may include service application circuitries 210A-N. The service application circuitries 210A-N may include hardware each configured to execute a particular service application of a mobile application in a separate container (e.g., thread and execution context). In some embodiments, when the mobile application is a consumer mobile application, different service application circuitries 210 may be configured to generate different application pages or page types for presentation on the user interface of the mobile device 108. In some embodiments, the service application circuities 210A-N may share common hardware, with the container structure of the service applications being defined by software configuration.

Circuitries 210A-N may utilize processing circuitry, such as the processor 202, to perform these actions. However, it should also be appreciated that, in some embodiments, one or more of circuitries 210A-N may include a separate processor, specially configured field programmable gate array (FPGA), or application specific interface circuit (ASIC). Circuitries 210A-N may therefore be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Mobile Service Applications

FIG. 3 shows a flow chart of an example of a method 300 for executing a mobile application including multiple service applications in accordance with some embodiments. Method 300 is discussed herein as being performed by system 100, and in particular by the mobile device 108 in connection with one or more servers 104. For example, method 300 may be performed to provide a mobile consumer application including multiple service applications to mobile devices 108.

Method 300 may begin at 302 and proceed to 304, where the mobile device 108 (e.g., including a service application circuitry 210) may be configured to install a mobile application including multiple service applications on the mobile device 108. For example, the mobile application may be installed on the mobile operating system of the mobile device 108. For example, the application may be downloaded from an application store application of the mobile device, or otherwise received by the mobile device, such as from the server 104 via the network 112. Once installed, the mobile application including the multiple service applications may execute on the mobile device 108.

Each service application may be configured to execute asynchronously on the mobile device 108 in a separate container, defining a unique thread and execution context. The service applications may employ a SOA design such that the service applications behaving like "servers" in terms of listening and responding to requests, and also such that the service applications include (1) explicit functional boundaries, (2) autonomous services that do not access the memory space, dependencies, etc., (3) shared schema and contract, not class, and (4) policy-based service compatibility. In some embodiments, each service application may be configured to execute on separate hardware, such as separate memories and/or processors. In some embodiments, the container separation may be defined based on software configuration, and a shared physical memory or processor may be used for execution of multiple service applications. In some embodiments, the code for each service application may be processed by a packager, such as to concat, transpile and minify JavaScript code into a single file (e.g., a jsbundle file) for each service application. Then each jsbundle file may be linked in accordance with a dependency tree.

In some embodiments, the service applications of the mobile application may be defined by a configuration file. The configuration file may include a collection of data that defines attributes of the service applications. To define the service applications, the configuration file may include an application service array having an entry for each service application, For example, a service application having domain name "api2" may be defined by:

services: {"api2.local":

{"name":

"api2",

"path": "./api2"

"devUrl": "https://localhost: 8083/index.ios-.bundle",}}

At 306, the mobile device 108 may be configured to determine a dependency tree for the service applications of the mobile application. A "dependency tree," as used herein, refers to data defining service application startup or execution dependencies for the mobile application. Unlike conventional monolithic mobile applications that execute in a single container or thread, the service applications of the mobile application may execute in separate, asynchronous, containers or threads. The division of a mobile application into separate service applications may be based on logical functional separation to support asynchronous service applications that execute on demand. Advantageously, for a particular requested or otherwise desired functionality, only some of the service applications of the mobile application will need to be startup or executed. In particular, the service application that is configured to execute the requested service or functionality must be startup, as well as any parent service applications of the requested service application on which the requested service application depends. Thus the dependency tree defines a hierarchy of service application dependencies with respect to startup (e.g. listen for requests), execution (e.g., execute request), and shutdown (e.g., stop listening for requests).

In some embodiments, the dependency tree may be defined by the configuration file, and specified as array of domain arrays. To avoid potential hidden circular dependencies, the array of arrays is used instead of a dependency graph. Within the configuration file, a "runLevel" key may be used to specify code of the arrays, such as:

"runlevels": [

["absoluteFirstDomain.local"],

["firstish.local", "secondish.local"],

["last.local"]]

Here, the dependency tree array indicates that the service application absoluteFirstDomain.local starts up first. The next run level-firstish.local and secondish.local-starts up after absoluteFirstDomain.local has registered completion of its startup (e.g., simultaneously or concurrently). After both firstish.local and secondish.local has registered completion of startup, last.local starts up.

Service applications may share common data storage or repositories. A single repository may be used, or separate repositories. A single repository may be defined by a tree structure, as shown below:

/services
/services/main
/services/services1
/services/services2
/services/serviceN FIGS. 6-8 show examples of dependency trees 600-800 for mobile applications, in accordance with some embodiments. Although dependency trees are not necessarily represented within the application code as graphs, dependency trees 600-800 show graphical representations of service application dependencies to help simply the disclosure. With reference to FIG. 6, dependency tree 600 includes nodes 602, 604, and 606, respectively representing service applications A, B, and C. The arrows between the nodes 602-606 define startup/execution dependencies of the service applications A, B, C. In particular, service application A depends on service applications B and C, and service application B depends on service application C. Service application C is a parent of service application A and B, and service application B is a parent of service application A. Thus to startup service application A, the service application C must be started, then service application B, then the service application A (or [C]→[B]→[A]).

With reference to FIG. 7, dependency tree 700 illustrate node dependencies for a mobile application including seven service applications A-G. Each service application or container may take a variable amount of time to startup, and thus dependency trees may define a multi-generational startup order for parent and child service applications. Furthermore, two or more service applications may be startup simultaneously when permitted or specified by the dependency tree. For example and with reference to the dependency tree 700, starting service application A may be achieved by starting service application F and G (e.g., simultaneously or in an order), waiting until service applications F and G have completed startup, then starting service applications E and B, waiting for startup to complete for service applications E and B, startup of service application C, waiting for startup of service application C to complete, then startup of service application A (or [F, G]→[E, B]→[C]→[A]).

In some embodiments, when a service application is configured to or dedicated to provide a particular application page of the mobile application, the dependencies of the service application may be defined at least in part by references or links of the application page. For example, an application page generated by a first service application may include a reference or link to functionality of a second service application to generate a second application page. Thus execution or startup of the first application may depend on the startup of the second service application. In another, the second service application may include functionality that is used by the first service application. The first service application is thus dependent on the second service application, and as used herein, the second service application is a "parent service application" of the first service application.

At 308, the mobile device 108 (e.g., a base or control application/service application) may be configured to determine to execute a (e.g., first) service application of the service applications of the mobile application. The determination to execute the service application may be based on various inputs received by the mobile application, such as from the user, a second mobile application, the mobile operating system, etc. For example, the determination may be based on a request from another application or service application. In another example, the determination to execute the service application may be based on user input and/or external application input, such as a user selecting a reference or link within an electronic marketing communication displayed on the mobile device (e.g., via email, text, search result, social network message or feed item, application alert, etc.).

In some embodiments, the mobile application may include a "base application." The base application may be the primary, home, default, or control application of the mobile application, providing application pages configured to support these functionalities. The base application may be configured to provide for the control and coordination (startup, shutdown, execution calls, etc.) of service applications. In some embodiments, a base application may be configured to generate a home page and/or menu page for the mobile application, and may call service applications based on user interaction with the home page provided by the base application. A particular service application may be defined as the starting service for the user interface or browser, which in some embodiments, may be specified at runtime with a show request to the service application such as:

```
RNCRequest * req = [[RNCRequest alloc] initWithHeaders:@{@ "Referer": @ "GPReactNative"}
                    verb : RNRequest_SHOW
                        url : @ "rn://dealdetails.local"
                        body:@{ }];
[[RNCInternet sharedInstance] setHomepageWithRequest:req onComplete:nil];
```

In some embodiments, the base application may be a service application itself (e.g., configured to receive service application requests), and is referred to herein as a "base service application." When the home or base application does not use a SOA architecture (e.g., receive service application requests), it may be configured to coordinate or control the calling of the service applications.

The mobile device 108 may be configured to provide for multiple entry points into the dependency tree, resulting in different startup/shutdown sequences for service applications. With reference to dependency tree 800 shown in FIG. 8, a service application may act as an entry point to the mobile application, such as shown by nodes 802 and 804 for service applications D and A. The startup of service application D uses a startup sequence [F, G]→[E]→[C]→[D]. The startup of service application A uses the startup sequence [F, G]→[E, B]→[C]→[A]. However, if service applications A and D are executed in sequence, then parent service applications for the service application A that have already been started up may be kept in service, and thus the startup of service application would only use the startup sequence [B]→[A].

In some embodiments, different applications and service applications of the mobile application may use different source code to produce efficiencies for code development.

For example, the base application may be coded using a native mobile operating system language (e.g., Objective-C) like conventional mobile applications. To ensure compatibility and high performance with different popular platforms (e.g., iOS or Android), the system 102 may maintain and distribute separate codebases for the mobile application in different native mobile operating system languages. As discussed above, such arrangements may lead to development inefficiency as two (or more) sets of code must be developed, tested, etc. prior to public rollout. Thus it is desirable to standardize codebases across different mobile operating systems. In some embodiments, dependencies of base application using native language may be defined using a dependency manager (e.g., CocoaPods, NPM) in alternative or addition to a dependency tree/configuration file.

In some embodiments, service applications may utilize a standard mobile application code format when possible, such as the React Native framework to produce native user interfaces on both iOS and Android mobile operating systems. As standard mobile application code formats expand to other non-UI aspects, additional functionality can be migrated from the base application to a service application. Thus service applications across different mobile operating systems may share a common codebase.

At 310, the mobile device 108 may be configured to determine, based on the dependency tree, one or more parent service applications of the service application. As discussed above, the dependency tree may define the parent service applications of the service application that should be startup to facilitate execution of the service application. The one or more parent service applications may include direct parents, as well as deeper ancestral dependencies (e.g., grandparents, great-grandparents, etc.). Each service application may include zero, one, or multiple parent service applications, and likewise for each parent service application of the service application, and so forth.

For example and with reference to the dependency tree 700 shown in FIG. 7, the service application A may include parent service applications B and C, which may include parent service application G (for B) and [F, E] (for C). Thus to startup service application A, each of service applications F, G, E, B, and C should be startup. Furthermore, the dependency tree 700 defines the startup order as [F, G]→[E. B]→[C] →[A] as discussed above.

At 312, the mobile device 108 may be configured to start up the one or more parent service applications based on the dependency tree. The dependency may define an order of the startup for multiple parent service applications. Each of the parent service applications may be started in separate containers or threads. With reference to the dependency tree 700, to startup service application A, the (great-grand) parent service applications F and G may be startup (e.g., simultaneously or concurrently), then the (grand) parent service applications E and B, and then parent service application C.

In some embodiments, subsequent to successful startup of a service application, the service application may be registered. For example, a service application having an "api.local" domain name may be configured to generate and send a registration status indication using:

componentWillMount: function ( ) {
      server.registerDomain ('api.local');
    }

In some embodiments, domains may be registered subsequent to registration of routes. In the example shown below, route handlers/heartbeat1 and/heartbeat2 are registered prior to registration of the domain api.local:

server.on.get ('/heartbeat1', function (req, res) {res.send ({message: 'hello'});});
    server.on.get ('/heartbeat2', function (req, res) {res.send ({message: 'hello'});
    });
    Server.registerDomain ('api.local');

In some embodiments, service applications may be configured to perform callbacks to determine the listening or startup status of other service applications. If a service application starts up at run level N, the service application may be configured to wait to execute actions or services started at N+1. Services may be notified when run levels are completely registered for a route runlevel-update/: runLevel. The runlevel parameter will include the run level and a query parameter indicating the run level status (e.g., as either starting or completing). For example, a callback request may include:

server.on.get ('/runlevel-update/: runlevel', (req, res)=> {//do something for all runlevels
    If (req.params.runlevel===4 && req.query.status== 'starting') {//do
    something only when run level 4 is starting up//note: service in run level 4 and higher wouldn't get this message}
    If (req.params.runlevel=== 'all' && req.query.status=== 'completed) {//do
    something once all run-levels have completed startup.}});

The: runLevel parameter will be called with the number of the runLevel being defined from 0 to N. Once all run levels are completed, all will be the input for the: runLevel parameter. The status parameter will be filled with either starting or completing indicating the state of the run level.

In some embodiments, dependency trees and/or run levels are not used for selectively controlling startup and shutdown of service applications. For example, if the runLevel key is not present in the configuration file, then all application services may be boot up simultaneously (e.g., at startup for the mobile application) rather than starting only a subset (e.g., dependencies) of service applications.

In some embodiments, when run levels or a dependency tree is specified, there may be instances where an application page is requested before the associated application server has been startup. The mobile device may be configured to wait until the application server is ready, show a native loading page, and then provide the application page to the user interface. Use a native loading page may be advantageous to show present a view to the user interface without delay. The loading page or view may be set using a setHomepage With Request method, with input being nil or 0 to show a blank loading page.

At 314, the mobile device 108 may be configured to, subsequent to starting up the one or more parent service applications, start up the service application in a thread separate from the threads of the one or more parent service applications. Once the parent service applications have been startup (e.g., in the order defined by the dependency tree) in threads, the service application may startup in a separate container or thread from the parent service applications. For example, after the parent service applications [F, G], [E, B], and C have been started up using the dependency tree 700, then the service application A may be startup.

At 316, the mobile device 108 may be configured to, subsequent to starting up the service application, execute the service application within the thread. For example, the service application when started up may be configured to listen for service application requests from other applications or service applications. Thus startup of the service application places the service application in a listening state in accordance with the SOA architecture of the mobile application. In response to receiving the service application request, or any other suitable input, the service application may be configured to execute. For service applications that generate application pages for presentation of the user interface, the service application may be configured to receive input parameters (e.g., defining the dynamic content of the page), and generate the application based on the input parameters.

FIG. 9 shows an example of a user interface 900 including an application page, in accordance with some embodiments. The user interface 900 may be presented within a display 902, and may be configured to generate output displays and facilitate entry of user inputs (e.g., via touch screen or other input device). The user interface 900 may include an application page 904 and a menu page 906. In some embodiments, two or more separate application pages provided by concurrently executing service applications may be concurrently provided within portions of the user interface 900, such as the application page 904 and the menu page 906.

The application page 904 is an example of a promotion detail application page that can be generated within a thread of a promotion detail page service application. To generate the page for a particular promotion, the service application may be configured to listen for and receive a service application request including a promotion identifier. The promotion identifier may be associated with a particular promotion (e.g., within database 106), and the service application may be configured to query the database with the promotion identifier to determine promotion data (e.g., promotion parameters like underlying item, image or video data, price data, (e.g., redemption) location data, promotion terms, etc.). The service application may use the promotion data to generate the promotion detail application page 904 for the input promotion, and provide the application page 904 to the user interface 902.

At 318, the mobile device 108 may be configured to determine whether execution of the service application has completed. The service application itself may include programming to determine the end of execution. In another example, execution may complete based on user input to the service application. With reference to user interface 1000 in FIG. 10, the application page 1004 may include references or links to other service applications, such as reference 1008. Selection of the reference or link may result in a request being sent to the second service application, and when suitable, completion of execution for the first service application.

In response to determining that execution of the service application has completed, method 300 may proceed to 320, where the mobile device 108 may be configured to shutdown the service application and the one or more parent service applications based on the dependency tree. Shutdown of the service application may be based on a reverse traversal of the dependency tree. For example and with reference to FIG. 7, shutdown of service application A may include shutdown of service application A, then shutdown of parent service application C, then shutdown of (grand) parent service applications [E, B] (e.g., simultaneously or concurrently), then shut own of (great-grand) parent service applications [F, G]. Thus the tree 700 defines the shutdown order for service application A as [A]→[C]→[E, B]→[F. G].

Service applications may also be restarted asynchronously. For example, an executing service application may be shutdown and then start up based on the dependency tree. With reference to FIG. 7, restart of service application A may be performed as shutdown ([A]→[C]→[E. B]→[F, G]) followed by startup ([F, G]=→[E, B]→[C]→[A]) for the service application A.

Returning to 318, in response to determining that execution of the service application has not completed, method 300 may proceed to 322, where the mobile device 108 may be configured to continue to execute the service application within the thread. For example, a particular application page may be kept on the user interface until execution of the service application has completed. Method 300 may then proceed to 322 and end.

FIG. 4 shows a flow chart of an example of a method 400 for requesting a service application in accordance with some embodiments. Method 400 may be performed in connection with method 300, such as at 316, where the mobile device 108 is executing a particular service application. Using method 400, an executing service application (or an external application) may call a second service application in accordance with the service orientated architecture (SOA) or microservices architecture pattern of the mobile application. The request may trigger the execution of the second service application within a separate container.

Method 400 may being at 402 and proceed to 404, where the mobile device 108 may be configured to execute a first service application in a first thread. Execution of the first service application may be performed as discussed above in method 300. For example, if the first service application is a base application, the first service application may be configured to control execution of other service applications via service application requests. In another example, the first service application in method 400 is not a "service" application, but a base application for the mobile application that controls service application execution for the mobile application. In yet another example, the first service application may be a service application different from a base application, such as a service application dedicated to presenting particular application pages.

At 406, the first service application of the mobile device 108 may be configured to generate, within the first thread, a first application page including a reference to a second application page. For example, if the first service application is a base application, the first service application may be configured to generate one or more base application pages for the mobile application, such as a home page, application menu, application configurations, login page, etc. The base application page may include a reference, link, button, etc. to other application pages, some or all of which may be associated with other service applications.

In another example, if the first service application is a promotion details page service application configured to generate a promotion details page, the promotion detail page may include references, links, buttons, etc. to other application pages, such as a fulfilment funnel (e.g., shopping cart, checkout, etc.). In another example, if the first service application is a redemption information page service application configured to generate a redemption information page for promotions that have been purchased or redeemed by the user, the redemption information page may include a listing of promotions with references, links, buttons, etc. to pages that provide promotion information.

At 408, the first service application may be configured to provide the first application page to a user interface of the mobile device 108. The first application page may be provided to the user interface for user interaction, such as selection of a reference or other interactive element of the first application page. With reference to FIG. 9, the application page 904 including the reference 908 may be provided to the user interface 902 of the mobile device 108.

At 410, the first service application may be configured to determine whether the reference to the second application page within the user interface has been selected. For example, if the mobile device includes a touch screen, then touch screen inputs at a location corresponding with the reference 908 within the user interface 902 may be received by the first service application, and used to determine selection of the reference.

In response to determining that the reference has not been selected, method 400 may return to 408, where the first service application may be configured to continue to provide the first application page to the user interface, monitor the user inputs within the user interface, and determine whether the reference (or any other reference) within the first application page has been selected.

Returning to 410, in response to determining that the reference has been selected, method 400 may proceed to 412, where the first service application may be configured to generate and send a request to the second service application to execute the second service application within a second thread. Service applications may be called to execute based on a SOA or web service-like calls.

When a service application is coded in a standard mobile application code format, a get request may be created in JavaScript using React Native. An example of a request is shown by Request 1:

```
server.get ('rn://math.local/double/2')
    .end ((err, res)=> {
        console.log (res.body.ans);/*ans-4 */});
```

Another example of a get request is shown by Request 2:

```
server.get ('rn://api.local/add')
    .query ({amount: 8})
    .send ({number: res.body.number})
    .end ((err, res)=> {
        //response
    });
```

Yet another example of a get request using an all-in-one syntax is shown by Request 3:

```
server.get ('rn://api.local/add', {/*headers*/}, {/*body*/},
    (er, res)=> {
        //response});
```

Requests to service applications may use various commands, such as server.get, server.post, server.put commands. In some embodiments, external HTTP calls may be made to other applications from a service application, such as using Fetch or Super-Agent APIs. In some embodiments, the same API may be used for both external application and internal service application requests.

Service application requests (e.g., using a get command) may include request parameters that define the requests. For example, the 'rn://math.local/double/2' and 'rn://api.local/add' parameters of the example requests provide references to particular service applications. In another example, where the reference is associated with a request for a promotion detail page for a promotion, the request parameters may include a reference to the promotion detail page service application, as well as a parameter defining the promotion to be presented such as a promotion identifier. In some embodiments, requests using the protocol or identifier "rn://" will designate an internal service application, while other protocols or identifiers may be used for external application calls (e.g., to a web service).

The second service application, having an associated reference within the first application page, may be a parent dependency of the first service application within the dependency tree, thus started and listening when the first service application generates the service application request. In another example, the second service application and any parent service applications (e.g., if not started up) may be started up in response to the service application request to the second service application.

Other types of hypertext transfer protocol (HTTP) verbs that may be used to request particular functionality of a service application may include: GET, HEAD, POST, PUT, DELETE, OPTIONS, TRACE, CONNECT, SHOW, etc.

Service requests and response may be configured to control the presentation of particular application pages to the user interface. For example, the "show" verb may be used to call a second service application that generates an application page, and to instruct the second service application to bring the application page to the user interface. The show verb may be used similar to an<a href= " ">command for HTML browsers, where an<a>tag in the browser is a GET request coupled a browser command to update the view with the GET response.

In some embodiments, requests to service application may be coded using a native code for a particular mobile operating system. For example, a monolithic mobile application may be converted into a base application and multiple service applications. The portions of the mobile application kept in the base application may continue to use the native code. These portions may include native routing code to handle routing between execution of native code and service application code. As such, the routing or glue code may be used to allow for transitions between application pages implemented with native iOS/Android code and a React Native page. An example of a service application code (in Objective-C) that may be requested is shown below by Service Application Code 1:

```
[RNCInternet sharedInstance] registerRoute: @ "/multi-
    ply/basenumber/by/smutiply
    NSNumber * basenumber= [req.params objectForKey:
        @"baseNumber"];
    NSNumber * multiplyNumber= [req.params objectFor-
        Key:
    @"multiplyNumber"];
    NSNumber*newNumber=@    {[baseNumber  inte-
        gerValue] * [bmultiplyNumber intergerValue];
    res.body=@ {@ "number": newNumber};
    res.send ( )}]1
```

The Service Application Code 1 may be requested (e.g., from a service application) using the standard mobile application code format (e.g., JavaScript) as shown by Request 4:

```
server.get ('rn://main.local/multiply/100/by/2').end ((err,
    res)-> {//res.body.number would equal 200});
```

Alternatively, the Service Application Code 1 may be requested (e.g., from a base application, external application, or other non-service application) using the native code format (e.g., Objective-C) as shown by Request 5:

```
Request*req= [RNCRequest alloc] initWithHeaders: @
    {@ "Referrer": NSStringFromClass (self.class)}
    Verb: RNCRequest_GET
    url: @ "rn://main.local.multiply/100/by/2"
    body: nil];
[[RNCInternet sharedInstance] issueRequest: req on
    Complete: ∧(RNCResponse * res) {//res.body.number
    would equal 200});
```

In some embodiments, a service application may be configured to perform automatic translations between native code format requests and standard mobile application code format requests. For example, the request string of Request 5 may be converted into the query and parameters of Request 4. Another example of an automatic conversion of routing code is shown below:
  //assume the following GET request:
  rn//userService.local/user/3?showfriends=true//40
  //you can register the route as
  server.on.get ('/user/: userID', function (req, res) {
  req.param.userId===3;//this would return true;
  req.param.showFriends===True//this would return true as well});

At 414, in response to receiving the request from the first service application, the second service application may be configured to execute within the second thread. The second service application, being a parent dependency of the first service application, has been started up and is in a listening state or mode for service application requests. In response to receiving the request, the second and first service application may execute asynchronously within separate containers on the mobile device 108. Executing the second service application may include performing a programmed functionality of the second service application, which in some embodiments, may include generating and providing a second application page to the user interface of the mobile device.

At 416, the second service application may be configured to generate and send a service application response to the first service application. The service application response may include an expected output and/or an indication that the second service application has successfully received and processed the request. In another example, the second service application may perform a predefined functionality that is used to facilitate execution of the first service application, and thus may return an output value to the first service application. An example of an application service response to a get Request 1 coded in JavaScript using React Native may include Response 1:
  server.on.get ('/double/: number', (req, res)=> {
    res.send ({ans: req.params.number * 2});
  });

An example of a service application response to a get request shown in Response 2:
  //respond with "Hello World!" on the homepage
  app.on.get ('/', function (req, res) {
    res.send ({message: 'Hello World!'});
  });

An example of a service application response to a post request is shown in Response 3:
  //accept POST request on the homepage
  app.on.post ('/', function (req, res) {
    res.send ({message: 'Got a POST request'});});

An example of a service application response to a put request is shown in Response 4:
  //accept PUT request at/user
  app.on.put ('/user', function (req, res) {
    res.send ({message: 'Got a PUT request at/user'});});

An example of a service application response to a delete request is shown in Response 5:
  //accept DELETE request at/user
  app.on.delete ('/user', function (req, res) {
    res.send ({message: 'Got a DELETE request at/user'});});

In some embodiments, the response format for a service application may be of a common data type, such as a JSON string. However, other types of formats may also be supported, such by using a content type parameter (e.g., similar to Content-Type parameters within an HTTP headers).

At 416, one or the first application page or the second application page may be provided to the user interface of the mobile device. Service applications may provide for view management of application pages generated asynchronously, effectively providing application pages that function similar to webpages within a web browser. For example, a service application may request to bring another service application to the user interface using:
  var RNHTTPBridge=require ('@sghiassy/rnhttpbridge');
  var browser=RNHTTPBridge ('app.local');
  browser.show ('anotherDomain.local?id=2');

The user interface may also be directed to go back to a previously presented application page, such with a browser.back ( ) command. In that sense, techniques discussed herein may control the startup, execution, and presentation of service applications of a mobile application. Method 400 may then proceed to 418 and end.

FIG. 5 shows a flow chart of an example of a method 500 for service application development in accordance with some embodiments. Method 500 may be performed in the course of development of a mobile application. In particular, a monolithic mobile application coded in a native mobile operating system languages (e.g., for iOS or Android) may be converted into a mobile application including multiple service applications that employ a standard mobile application code format, such as in JavaScript using React Native for user interface pages.

Method 500 may being at 502 and proceed to 504, where a determination may be performed to effectively separate the native mobile application into a native base application and multiple service applications. The separation of the native, monolithic mobile application may be based on functionality as discussed above to allow for asynchronous execution across multiple containers.

The base application may include a home application as discussed above, and may be configured to control the execution of the service applications, such as the creation and display of other application pages provided by other service applications.

At 506, the service applications may be created using a standard mobile application code format. To port previously existing functionality, portions of code using the native mobile operating system language may be converted into the standard mobile application code format. In another example, new functionality or service applications may also be generated and incorporated with the mobile application.

At 508, the base application may be modified to request the service applications. For example, previous function calls of the base application coded may be modified to generate service application requests. The base application may use the native mobile operating system language to generate the requests. In that sense, a single mobile application may include interoperable service applications coded in different programming languages.

At 510, a test may be performed to compare the mobile application with the native mobile application. The test may include an A/B test performed to compare the functionality of the mobile application with the native mobile application based on various suitable parameters such as user interaction (e.g., how frequently the user interacts with the re-implemented page compared to the native page, ideally no change), page performance (e.g., how fast the re-implemented page loads or reacts to user inputs compared to the native page), overall application performance (e.g., how fast the modified application boots up compared to the native application, memory usage-because high memory usage means the operating system will reject the application from memory more often, leading to more cold starts), developer experience (e.g., how easily development is using these technologies compared with existing technologies), code sharing (e.g., how much code can or should most use service applications to achieve best performance), etc.

In some embodiments, service applications may communicate with the central system 102 for web services or other backend functionality. Service applications may be configured to call an appropriate gateway application programming interface (GAPI) endpoint. Some other types of errors that may be tested may include testing server interaction of service applications. For example, at the micro level, some error detection criteria may include the GAPI being down (e.g., error handling code around API calls can show an error screen with a retry button or fail silently), the GAPI is returning corrupt data (e.g., improper error handling code), or the mobile device runs out of memory executing service applications (e.g., resulting in application crash). At the macro level, error detection criteria may include performance (e.g., mobile application is less responsive or fast than native application) and design scaling. With respect to design scaling, the container overhead (e.g., memory space and threads) of each service application may result in performance degradation in lower-end devices. Thus testing may be performed to compare performance as a function of the number of service applications used in the mobile application. The results of the testing may be used to redesign, modify, or otherwise update the mobile application.

The testing or other operating of the mobile application may be automatically logged. In some embodiments, a dedicated service application may be configured to provide logging, such as a log.local service application. Here, if the mobile application (e.g., a native base application or a service application) or other application requests the log.local service application, logs for the requesting service may be kept and stored in a log.local/log directory. In some embodiments, logs for different applications may be differentiated using a referrer header, as shown by:

server.on.get ('/log/, function (req, res) {
if (req.header.Referer=== 'React-Capacitor") {//
these are logs from the framework}
else {
//these are logs from your application}});

Other types of activities that may be automatically logged may include page push, pop, and transitions. Various suitable log data formats may be used.

At 514, one or more successfully tested service applications and/or the base application may be provided to the mobile device 108 to update the mobile application. In some embodiments, individual service applications may be updated without updating the other service applications of the mobile application.

If an A/B test is unsuccessful for a particular service application, the service application and corresponding base application call may be rolled back or otherwise updated. When a bug or defect is discovered post release for a particular service application, that service application may be patched or rolled back without updating or otherwise modifying the other service applications. In some embodiments, the system 102 may be configured to control the individual updating of service applications automatically when an update is prepared, such as without requiring user input or specific permission. In some embodiments, the system 102 may be configured to perform partial rollouts of a service application update to a subset of the population of users/consumer devices 108.

Steps 506-514 may be iterated to further convert additional functionality of the native mobile application into a service application, or to update existing service applications. In some embodiments, method 500 may be repeated until the mobile application is implemented as multiple (e.g., all) service applications. The different service applications may be handled by different developers or developer teams, and may be coded using different programming languages, etc. while preserving effective interoperability and functionality of the mobile application.

Service applications may be updated independently of each other, thereby making it possible to release updates often (e.g., daily or weekly) and without conventional application store pushes, push safe releases that target individual areas of the application and can be rolled out in a staged manner, allow pushing bug fixes that don't require user-triggered application updates in iOS/Android, re-use code between iOS and Android (as much as possible) instead of implementing everything twice to increase overall development speed, and create a codebase that can be updated safely and easily by many different, distributed teams. Method 500 may then proceed to 516 and end.

CONCLUSION

Many modifications and other embodiments will come to mind to one skilled in the art to which these embodiments pertain having the benefit of the teachings presented in the foregoing descriptions and the associated drawings. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

The invention claimed is:

1. A mobile device configured for providing a mobile application, the mobile application including a plurality of service applications, the mobile device comprising circuitry configured to:
determine a dependency tree for the mobile application, wherein the dependency tree defines startup and shutdown dependencies among the plurality of service applications and each service application is configured to execute within a separate thread upon startup; and
in response to a selection of a first reference within a communication or an external application:
(i) determine to execute a first service application of the plurality of service applications;
(ii) determine, based on the dependency tree, one or more parent service applications of the first service application; and
(iii) startup the one or more parent service applications based on the dependency tree in one or more threads,
wherein the one or more parent service applications comprise at least one parent service application and at least one grand-parent service application that depends on the at least one parent service application,
wherein the first service application and the one or more parent service applications are started in an order defined by the dependency tree, wherein the order comprises starting up the at least one grand-parent service application and starting up the at least one parent service application after the at least one grand-parent service application has completed startup.

2. The mobile device of claim 1, wherein the circuitry is further configured to:
startup the one or more parent service applications simultaneously or concurrently based on the dependency tree.

3. The mobile device of claim 1, wherein the circuitry is further configured to:
subsequent to starting up the one or more parent service applications, startup the first service application in a first thread separate from the one or more threads.

4. The mobile device of claim 3, wherein the circuitry is further configured to:
subsequent to starting up the one or more parent service applications, generate, within the first thread and by the first service application, an application page including a second reference to a second service application, wherein the second service application has been started up as a parent service application of the first service application.

5. The mobile device of claim 4, wherein the circuitry is further configured to:
provide the application page to a user interface of the mobile device.

6. The mobile device of claim 5, wherein the circuitry is further configured to:
in response to determining user selection of the second reference, send a service application request to the second service application to execute the second service application.

7. The mobile device of claim 6, wherein the first service application is a base application coded in a native mobile operating system code format, and the second service application is coded in a standard mobile application code format.

8. The mobile device of claim 7, wherein the second service application is configured to present a second application page that includes a promotion details page or a redemption information page.

9. A method for a mobile device to provide a mobile application, the mobile application including a plurality of service applications, the method comprising:
determining a dependency tree for the mobile application, wherein the dependency tree defines startup and shutdown dependencies among the plurality of service applications and each service application is configured to execute within a separate thread upon startup; and
in response to a selection of a first reference within a communication or an external application:
(i) determining to execute a first service application of the plurality of service applications;
(ii) determining, based on the dependency tree, one or more parent service applications of the first service application; and
(iii) starting up the one or more parent service applications based on the dependency tree in one or more threads,
wherein the one or more parent service applications comprise at least one parent service application and at least one grand-parent service application that depends on the at least one parent service application,
wherein the first service application and the one or more parent service applications are started in an order defined by the dependency tree, wherein the order comprises starting up the at least one grand-parent service application and starting up the at least one parent service application after the at least one grand-parent service application has completed startup.

10. The method of claim 9, further comprising:
startup the one or more parent service applications simultaneously or concurrently based on the dependency tree.

11. The method of claim 9, further comprising:
subsequent to starting up the one or more parent service applications, startup the first service application in a first thread separate from the one or more threads.

12. The method of claim 11, further comprising:
subsequent to starting up the one or more parent service applications, generate, within the first thread and by the first service application, an application page including a second reference to a second service application, wherein the second service application has been started up as a parent service application of the first service application.

13. The method of claim 12, further comprising:
provide the application page to a user interface of the mobile device.

14. The method of claim 13, further comprising:
in response to determining user selection of the second reference, send a service application request to the second service application to execute the second service application.

\* \* \* \* \*